Patented June 18, 1946

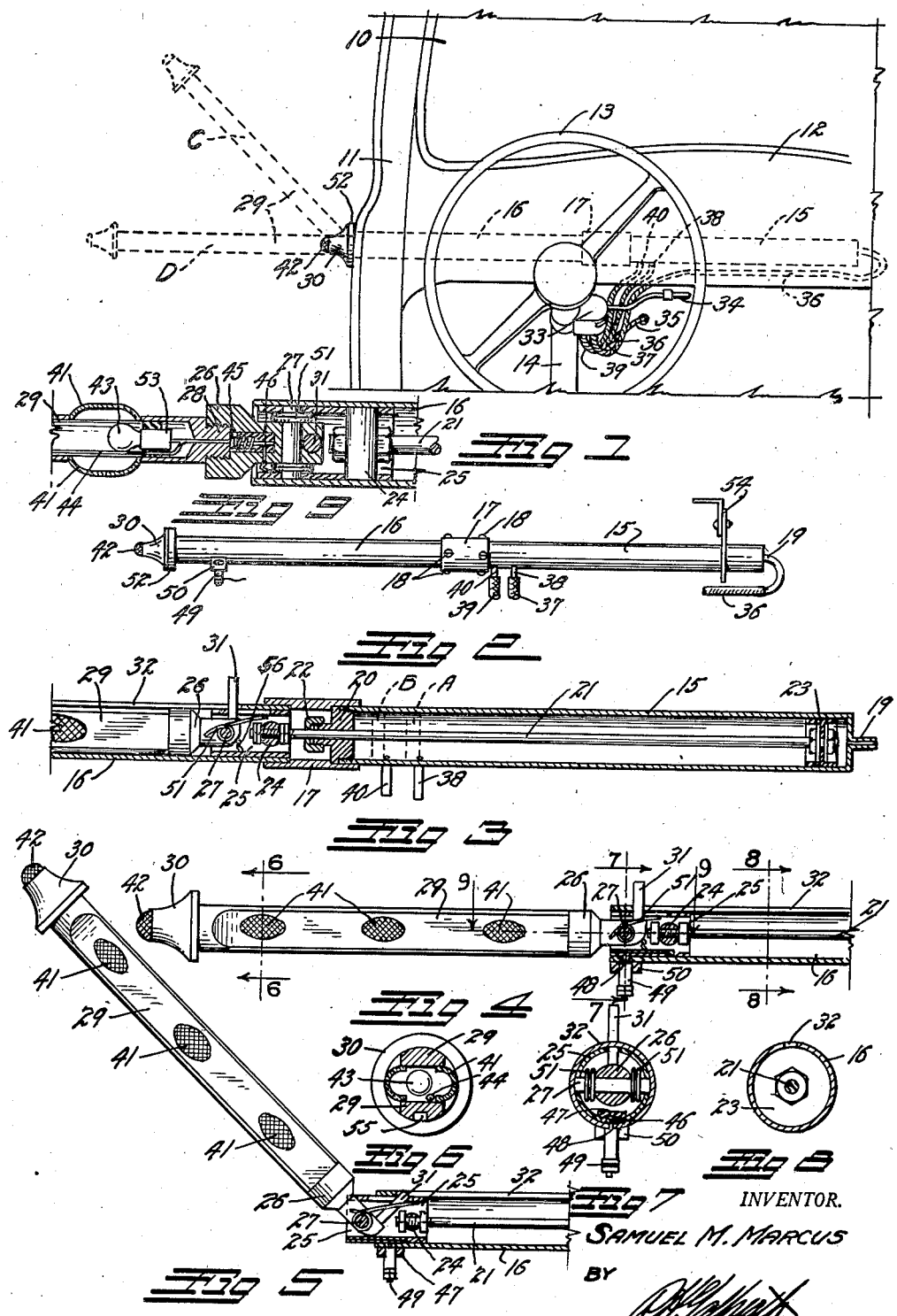

2,402,255

UNITED STATES PATENT OFFICE 2,402,255

DIRECTION INDICATOR

Samuel M. Marcus, Denver, Colo.

Application September 28, 1944, Serial No. 556,190

3 Claims. (Cl. 116—39)

This invention relates to a direction indicator for vehicles and more particularly for automobiles and trucks. It has for its principal object the provision of a simple and highly efficient device which will be inconspicuous when not in use, and exceedingly conspicuous when in use.

Other objects are to provide an indicator: which will not mar or damage the vehicle; which will not interfere with any of the useable space on the interior or exterior of the vehicle; and which will be visible to and under instant control of the driver at all times.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an interior view of the vehicle looking toward the instrument panel thereof, illustrating the position of the invention therein;

Fig. 2 is a side view of the improved direction indicator in the closed or retracted position;

Fig. 3 is an enlarged longitudinal section through the rear portion of the indicator, illustrating it in the retracted position;

Fig. 4 is a similar longitudinal section through the forward portion of the indicator, illustrating it in the projecting or "left turn" position;

Fig. 5 is a similar view illustrating the indicator in the "right turn" position;

Fig. 6 is a still further enlarged cross-section through the semaphore arm of the indicator, taken on the line 6—6, Fig. 4;

Fig. 7 is a similar section taken on the line 7—7, Fig. 4;

Fig. 8 is a similar section taken on the line 8—8, Fig. 4; and

Fig. 9 is a similarly enlarged longitudinal section through the hinge portion of the semaphore taken on the line 9—9, Fig. 4.

In Fig. 1 various parts of a typical automobile are designated by numerals as follows: windshield 10, door jamb 11, instrument panel 12, steering wheel 13 and steering column 14.

The invention is designed to be placed forwardly of the instrument panel 12 beneath the cowl of the automobile, and to project through the side thereof forwardly of the left door jamb 11. The control for the indicator is designed to be mounted upon the steering column 14.

The improved indicator comprises an operating cylinder 15 maintained in axial alignment with a cylindrical guide tube 16, of the same diameter as the cylinder, by means of a connecting sleeve 17 to form a single elongated tubular mechanism which can be inserted through a small opening in the side of the car, and supported in any desired manner forwardly of the instrument panel where it will be entirely concealed. An adjustable supporting bracket 54 is provided to be attached in any desired way at any desired point beneath the cowl of the automobile to support the inner extremity of the indicator. The forward extremity of the cylinder is closed by means of a threaded head 20, through which, a piston rod 21 passes.

The head 20 is sealed about the piston rod 21 by means of suitable packing, held in place by a packing nut 22. The inner extremity of the piston rod 21 terminates in a piston 23 snugly fitting the walls of the cylinder 15. The forward extremity of the piston rod 21 is clamped in a cross-bar 24 which extends diametrically across a sliding sleeve 25 which is slidably mounted in the guide tube 16.

A semaphore fitting 26 is hingedly mounted in the frame sleeve 25 on a hinge pin 27, which also extends diametrically across the sleeve 25. The fitting 26 is formed with an internally threaded socket for receiving an externally threaded stud 28, formed on a hollow semaphore arm 29.

The semaphore arm extends forwardly through the guide tube 16 terminating in a head 30 having a contour simulating the head of an arrow.

A lever arm 31 extends upwardly from the fitting through a longitudinally extending slot 32 in the guide tube 16. The lever arm 31 maintains the semaphore arm in its proper vertical position and prevents rotation thereof in the guide tube. The slot 32 terminates a short distance before the extremity of the guide tube 32 is reached, so that, if the frame sleeve 25 is forced forwardly to its extreme position, the lever arm 31 will strike the extremity of the slot 32 causing the lever arm to be tilted inwardly thus lifting the outer extremity of the semaphore arm upwardly, as shown in Fig. 5.

The movements of the arm are accomplished from the vacuum of the automotive engine, and the movements are controlled by means of a three-way valve 33, mounted on the column 14 and operated by means of a valve lever 34.

A vacuum tube 35 connects the valve 33 with any suitable vacuum connection on the engine. A return tube 36 connects the three-way valve 33 with the suction nipple 19 of the cylinder 15. A first operating tube 37 connects the valve 33 with a first nipple 38, communicating through the wall of the cylinder 15.

It is desired to call attention to the fact that the nipple 40 is positioned nearer to the head 20 of the cylinder than the nipple 38. The purpose of this is to provide two definite lengths of stroke for the piston 23. Thus, if the vacuum is applied to the nipple 38, the piston 23 will move to the position indicated in broken line at A, Fig. 3; and, if vacuum is applied to the nipple 40, the piston 33 will move to the position B of Fig. 3.

The piston rod 21 is so adjusted that when the piston is in the position A, the lever arm 31 will be at the outer extremity of the slot 32, and the semaphore arm will be supported in a horizontal position, as shown in Fig. 4, to designate a "left turn." When the piston 23 is in the position B, the semaphore arm will be forced still further outwardly to cause the previously described upward tilting action of Fig. 5 to give the "right turn" indication.

The three-way valve 33 is so arranged that when the lever 35 is forced upwardly from the position of Fig. 1, it will connect the vacuum tube 35 to the second tube 39 to give a "right turn" indication as indicated at C in Fig. 1. When the lever 34 is pushed downwardly from the position of Fig. 1 it will connect the vacuum tube 35 to the first tube 37, projecting the sleeve arm to the position D of Fig. 1, to give the "left turn" indication. When the lever 34 is in the intermediate position, as shown in Fig. 1, it will connect the vacuum tube 35 to the return tube 36, creating a partial vacuum on the rear of the piston 33 to return it to and hold it in the concealed position of Figs. 1 and 3.

Means may be provided for illuminating the semaphore arm, is desired, by means of faceted colored lenses 41 and 42.

The lenses may be illuminated by means of suitable electric lamps 43, mounted in suitable lamp sockets 53 in the hollow interior of the semaphore arm.

Current may be supplied to the lamps 43 through a conductor 44, a contact 45, a conductor 56, and a conductor bar 46, mounted in an insulating block 47 in the frame sleeve 25.

The conductor bar 46 contacts a brush 48 mounted in a binding post 49 which in turn is mounted in an insulating block 50 on the guide sleeve 32.

Shock springs 51 are coiled about the hinge pin 27 to cushion the weight of the semaphore arm 29 as it returns from its up-turned, "right turn" position of Fig. 5.

The guide tube 16 extends through a single accurately fitting opening in the side of the car, and the edges of this opening may be concealed by means of an escutcheon ring 52 to present a neat appearance on the exterior. The only portion of the device that is visible when not in use is the ornamental head 30 with its jeweled lens 42.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A direction indicator comprising: an elongated cylinder; a similarly elongated guide tube; means for maintaining said cylinder and said tube in axial alignment; a piston in said cylinder; a piston rod extending from said piston into said guide tube; a cross-head secured to the projecting extremity of said piston rod and slidably mounted in said guide tube; a semaphore fitting hingedly mounted in said cross-head; a semaphore arm detachably connected to said fitting; a lever arm projecting from said fitting through a longitudinally extending slot in said guide tube; said slot having a lesser length than the travel of said lever arm so that when said fitting approaches the extremity of its outward travel, said lever arm will be tilted by contact with the extremity of said slot to swing said semaphore arm upwardly; means for applying suction to the opposite faces of said piston; and means for limiting the movement of said semaphore fitting either to the length of said slot or to a point beyond said slot as desired.

2. A direction indicator comprising: an elongated cylinder; a similarly elongated guide tube; means for maintaining said cylinder and said tube in axial alignment; a piston in said cylinder; a piston rod extending from said piston into said guide tube; a cross-head secured to the projecting extremity of said piston rod and slidably mounted in said guide tube; a semaphore fitting hingedly mounted in said cross-head; a semaphore arm detachably connected to said fitting; a lever arm projecting from said fitting through a longitudinally extending slot in said guide tube; said slot having a lesser length than the travel of said lever arm so that when said fitting approaches the extremity of its outward travel, said lever arm will be tilted by contact with the extremity of of said slot to swing said semaphore arm upwardly; means for applying suction to the opposite faces of said piston; and means for limiting the movement of said semaphore fitting either to the length of said slot or to a point beyond said slot as desired; and resilient means for cushioning the return movement of said semaphore arm from its elevated position.

3. A vacuum-operated direction indicator for vehicles comprising: an operating cylinder; a cylindrical guide tube of the same diameter as said cylinder; a tubular connecting sleeve securing the forward head of the cylinder in axial alignment with the rearward extremity of the guide tube; a piston in said cylinder; a piston rod extending from said piston through said head into said guide tube; a tubular sliding sleeve slidably mounted in said guide tube, said sliding sleeve being mounted on the forward extremity of said piston rod; a hinge pin extending diametrically and horizontally across said sliding sleeve; a semaphore fitting hingedly mounted on said pin and extending forwardly therefrom; a semaphore arm extending forwardly from said fitting and lying normally within said guide tube; a head on said semaphore arm closing said guide tube when said arm is withdrawn therein; a lever arm extending upwardly from said fitting through a slot in said sliding sleeve and through a longitudinally extending slot in said guide tube, said latter slot terminating before the extremity of the guide tube is reached so that if the sliding sleeve is forced forwardly to its extreme position, the lever arm will strike the extremity of the latter slot to lift the semaphore arm upwardly.

SAMUEL M. MARCUS.